June 6, 1950            K. MacLEISH            2,510,930
SYSTEM FOR MEASURING LIMITED CURRENT CHANGES
Filed Oct. 11, 1945
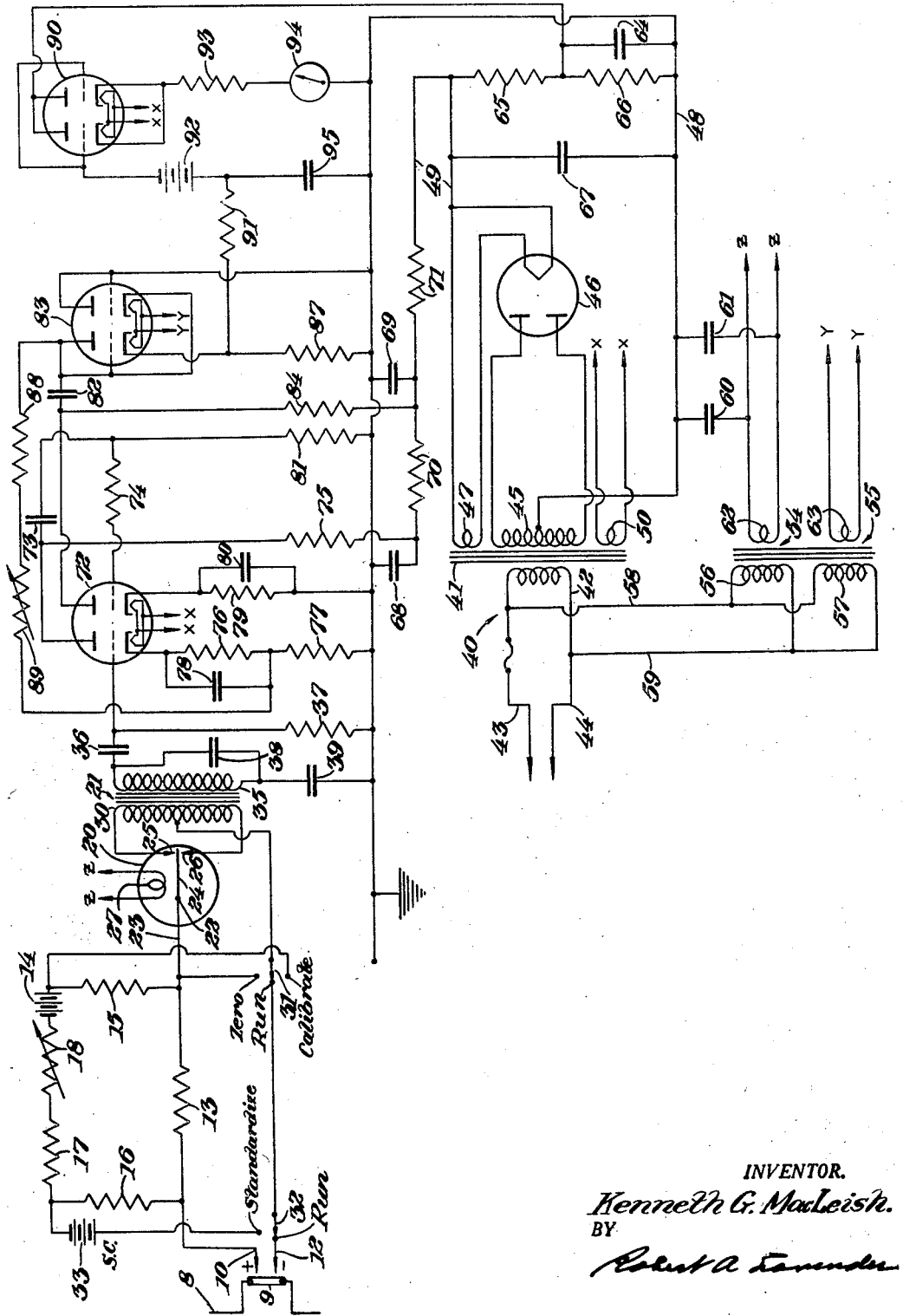
INVENTOR.
Kenneth G. MacLeish.
BY Patented June 6, 1950

2,510,930

UNITED STATES PATENT OFFICE 2,510,930

SYSTEM FOR MEASURING LIMITED CURRENT CHANGES

Kenneth G. MacLeish, Oak Ridge, Tenn., assignor, by mesne assignments, to the United States of America as represented by the United States Atomic Energy Commission Application October 11, 1945, Serial No. 621,847

4 Claims. (Cl. 171—95)

This invention relates to meters and measuring devices and is particularly concerned with a system and arrangement for accurately measuring and indicating currents using a standard instrument, the arrangement being such that the current is indicated more accurately than is otherwise possible, and the meter being used to indicate a current which would otherwise require an instrument having a much greater range.

The invention is particularly advantageous in circumstances where it is desirable, for example, to measure and indicate relatively large currents say in the neighborhood of 10,000 amperes for instance. Ordinarily an instrument, that is an ammeter, having a scale from 0 to 10,000 amperes would be used, and if the current being measured was one which remained fairly steady in the neighborhood of 7500 amperes for instance, only a relatively small part of the scale of the ammeter would normally be used, and since the graduations would be relatively close together, the reading of current would not be especially accurate. In practising my invention, instead of using an ammeter having a scale from 0 to 10,000 amperes in the above circumstances, I use a 0 to 1,000 ampere ammeter and recalibrate the scale to read from 7,000 to 8,000 amperes, that is, the ammeter reads 7,000 amperes when no current is going through it and 8,000 amperes full scale; my invention then contemplates preventing any of the current to be measured from passing through the meter until its value exceeds 7,000 amperes so that the ammeter as thus calibrated reads the current to be measured directly. This arrangement contemplates blocking the first 7,000 amperes of current, or a current proportional thereto or a voltage proportional thereto from having any effect on the ammeter. The result of my arrangement is in effect to expand that part of the scale of an ammeter having a very wide range in the vicinity of the normal value of the current being measured. In other words, with my arrangement having the ammeter calibrated from 7,000 to 8,000 amperes, the scale is expanded in this range, that is the graduations are farther apart, and if, for example, as so calibrated each division of the scale corresponds to 20 amperes increment in current, the current is therefore indicated directly to the nearest 10 amperes.

The object is as stated in the foregoing, that is to provide an arrangement whereby an ammeter is calibrated to read from a given value of current to a given higher value of current and the current to be measured up to said first given value or a current or a voltage proportional thereto is prevented from influencing or affecting the ammeter.

Another object of the invention is to provide a current measuring and indicating arrangement wherein a given part of the current to be measured or a voltage corresponding thereto up to a predetermined value of the current is prevented from influencing the ammeter and the ammeter is calibrated with a current value at the beginning of the scale corresponding to the value of current thus suppressed.

Another object of the invention is to provide a current indicating arrangement wherein the current to be measured is converted to a proportional voltage, a predetermined part of said voltage is balanced and cancelled out and a current proportional to the remaining voltage is caused to pass through the ammeter, the ammeter being calibrated so that the beginning of the scale has a current value corresponding to the voltage which is balanced and cancelled out.

Another object of the invention is to provide a current indicating arrangement wherein the current to be measured is converted to a proportional voltage, a predetermined part of said voltage is balanced and cancelled out and the remaining voltage is converted to a proportional alternating current which is amplified and caused to produce a proportional current which is indicated on an ammeter having a scale beginning with a figure corresponding to a voltage which is balanced and cancelled out.

Further objects and numerous of the advantages of my invention will become apparent from the following detailed description and annexed drawing, the single figure of which is a wiring diagram illustrating the manner of practicing my invention.

Referring to the drawing, numerals 10 and 12 represent a pair of leads which are connected across a shunt 9 which is in the circuit 8 (this may be any circuit) wherein it is desired to measure the current. For purposes of explanation, the shunt which leads 10 and 12 connect across may be a 10,000 ampere shunt across which there is a voltage of 50 millivolts. In accordance with my invention I provide an arrangement to oppose and balance out a part of the 50 millivolts corresponding to 7,000 amperes (for example) of the shunt current. To accomplish this I provide a resistance 13 and arrange to develop a voltage across this resistance which opposes and balances a part of the shunt voltage corresponding to 7,000 amperes of shunt current. The resistance 13 is connected across a dry cell 14 through resistances 15, 16 and 17 and variable resistance 18. The purpose of the variable resistance 18 will be described presently. The arrangement is such that when one milliampere of current flows through resistance 13, the voltage across this resistance is equal to the shunt voltage corresponding to 7,000 amperes of shunt current. Shunt voltage developed by current in excess of 7,000 amperes is converted by mechanical converter 20 and input transformer 21 to a square wave 60 cycle voltage which is amplified by an A. C. amplifier and then rectified and again amplified and indicated on an ammeter as will be described. The excess voltage, that is the voltage developed by current in excess of 7,000 amperes, is impressed on terminal 22 of the converter 20 through wire 23 and terminal 22 connected to the vibrating switch blade 24 of the converter which is mechanically-electrically operated between upper and lower contacts 25 and 26 of the converter. The converter is of standard type and the operating means for the switch blade 24 may include a winding 27 having leads thereto designated by the characters Z—Z. The contacts 25 and 26 connect to the terminals of the primary 30 of input transformer 21 and the center tap of the primary 30 is connected to the negative shunt lead 12. This connection is through a single pole, double throw switch 31, the contacts bearing the legends Zero, Run, and Calibrate; the connection is also through a single pole, single throw switch 32, the contacts bearing the legends Standard, and Run as shown on the drawing. The balancing circuit which balances a part of the shunt voltage corresponding to 7,000 amperes shunt current includes a standard cell 33, the purpose of which will be presently described as well as the switches just referred to.

The converter 20 converts the voltage input thereto to an alternating current voltage and the output of the transformer 21, that is the voltage across the secondary 35 of the transformer is a 60 cycle, square wave voltage which is transmitted through a coupling network consisting of condenser 36 and resistance 37. This 60 cycle signal is impressed on an A. C. amplifier as will presently be described. Condenser 38 is connected across secondary 35 and the secondary 35 is connected to ground through condenser 39. Condenser 38 shunts certain high frequency components in secondary 35.

Numeral 40 indicates generally the power supply for the amplifier-rectifier system which forms a part of the invention. Power supply 40 includes the transformer 41 having a primary winding 42 through which power is supplied by leads 43 and 44 from any 115 volt, 60 cycle source (for example). Transformer 41 includes a secondary 45, the ends of which connect to the plates of a full wave rectifier tube 46, the filamentary cathode thereof being connected across another secondary 47 of the transformer 41. The midpoint or center tap of secondary 45 is connected to a ground wire 48 as shown, the full wave rectifier tube 46 operating in the usual manner to produce a direct current voltage between the ground wire 48 and wire 49. The transformer 41 has another secondary winding 50 having leads designated by the characters X—X and these leads supply power to corresponding tube filaments having leads designated by characters X—X. Numerals 54 and 55 designate transformers having primaries 56 and 57 respectively connected by wires 58 and 59 to the same power supply which leads 43 and 44 connect to. Transformer 54 has a secondary 62 having leads designated by characters Z—Z connected thereto and these leads supply power to the winding 27 of converter 20, this winding having leads also designated by the characters Z—Z. Leads Z—Z are connected to ground through by-pass condensers 60 and 61. The transformer 55 has a secondary 63 having leads designated Y—Y connected thereto and these leads supply power to one of the tubes in the amplifier circuit having leads designated Y—Y connected to its filamentary cathode.

The output from the full wave rectifier 46 has a voltage divider consisting of resistances 65 and 66 connected thereacross and also there is a filter condenser 67 connected across this output. Filter condenser 64 is connected across resistance 66. Between the hot wire 49 and ground wire 48 there is a conventional filtering system consisting of condensers 68 and 69 and resistances 70 and 71.

The voltage signal consisting of the output from transformer 21 is impressed on the grid of a twin triode amplifier tube 72 and the plate circuit of the left triode of this tube is coupled to the grid of the right triode through the network consisting of condenser 73, resistance 81 which connects to ground and the grid current limiting resistance 74. The plate circuit of the left triode of tube 72 has plate load resistor 75 therein. The cathode of the left triode is connected to ground through a voltage divider consisting of resistors 76 and 77, the resistance 76 constituting a cathode resistor and having the cathode by-pass condenser 78 connected across it. The cathode of the right triode of tube 72 has the cathode resistor 79 which connects it to ground with the cathode by-pass condenser 80 connected across this resistance. The plate circuit of the right triode of tube 72 is coupled through condenser 82 to the plate and the grid of the left triode of the rectifier tube 83 and to the cathode of the right triode of this tube. The plate circuit of the right triode of tube 72 has plate load resistor 84 in circuit therewith. The cathode of the left triode of tube 83 connects to ground through cathode resistor 87. The left triode of tube 83 acts as a diode, this tube constituting a rectifying tube for rectifying the A. C. signal amplified by tube 72. The plate and grid of the right triode of tube 83 are tied together and to ground, the two triodes of tube 83 operating in the conventional manner of this type of tube to rectify the A. C. current supplied to the tube. The common filament of the two triodes of tube 83 is supplied with power through the leads Y—Y previously referred to.

Action of the amplifier tube 72 is stabilized by means of a negative feedback circuit from the plate of the left triode of tube 83 through a resistance 88 and a variable resistance 89 to the center tap of the voltage divider consisting of resistances 76 and 77. This feedback circuit operates in the conventional manner of inverse feedback circuits to stabilize the amplifier action of the tube 72, the feedback voltage being determined by resistance 77 which is part of the feedback circuit.

The output of the tube 83 is coupled to a D. C. amplifier 90 through a filtering network consisting of resistance 91, condenser 95 and a battery 92 which impresses a negative bias on the grids of the tube 90, the two grids being tied together as shown. The plates are also tied together and they are tied to the midpoint of the voltage divider consisting of resistances 65 and 66 connected across the output of the power supply 40. The cathodes of tube 90 are also tied together as shown and they connect through a resistance 93 and through the specially calibrated ammeter 94 of my invention to ground as shown. The common filament of the two triodes of tube 90 is supplied with power through the leads designated as X—X as previously described. The tube 90 operates in the conventional manner of a D. C. amplifier for amplifying the output of the tube 83 and this amplified current passes through the ammeter 94.

For reasons previously described the ammeter 94 has a 1,000 ampere range and the scale is calibrated from 7,000 amperes at the left end, that is at the beginning to 8,000 amperes at the extreme of its range.

In the operation of the system when there is 7,000 amperes of current in the shunt 9, a voltage will be developed which will be just balanced by the voltage across resistance 13 developed by the dry cell 14 in circuit with the resistances 13, 15, 16, 17 and 18. For any shunt current above 7,000 amperes a shunt voltage will be developed which is in excess of the voltage across resistance 13 and this excess voltage will be impressed on the converter 20 which will convert it to an alternating voltage which is applied across the primary of transformer 21. The output of transformer 21 as described above is a 60 cycle square wave voltage which is impressed on the left triode of the tube 72 and this tube amplifies the incoming signal, the tube 72 being a two-stage alternating current amplifier. The alternating current signal from tube 72 is rectified by tube 83 in the manner described above and the output of tube 83 is amplified by the D. C. amplifier 90 and the output of this tube passes through the ammeter 94. From the foregoing it is to be seen that any current above 7,000 amperes in the shunt will appear as a current in the output of tube 90 which will pass through the ammeter 94. Thus whenever the shunt current exceeds 7,000 amperes the ammeter will begin to register and thereafter will indicate directly whatever the value of the shunt current is, between 7,000 and 8,000 amperes. The scale of the ammeter may be such, for example, that each division of the scale represents an increment of 20 amperes of current and thus the shunt current can be read directly and accurately to within 10 amperes. It will be observed by those skilled in the art that the arrangement has the effect of expanding a portion of the scale of a meter having a much wider range. Also a meter having a relatively smaller range can be used for reading currents which would otherwise be far beyond the scale of the meter.

For checking the mechanical Zero of the meter 94 the switch 31 is moved to the Zero position which short circuits the input to the converter 20 and the ammeter 94 can then be mechanically set to read Zero if it does not then read Zero.

For calibrating the amplifier circuit the switch 31 is moved to the Calibrate position which places resistance 15 directly across the input to the converter 20. Resistance 15 is a very accurate resistance having a fixed voltage drop thereacross and thus when it is connected directly across the input to the converter 20, the meter 94 should indicate a fixed predetermined value of current and the circuit can be calibrated then to make the meter indicate this value of current by adjusting the variable calibrating resistance 89 in the inverse feedback circuit of the amplifier.

In order to check the voltage of the dry cell 14 its output can be checked by moving the switch 32 to its Standardize position which places the standard cell 33 in opposition to the dry cell 14. When the standard cell 33 is thus opposing the dry cell 14 the input to the converter 20 should be such that the meter 94 gives a zero reading and the system can be adjusted so that it does give this reading by adjusting the variable resistance 18. Thus the standard cell 33 and the variable resistance 18 are used to adjust for any drift in the reference voltage developed by the cell 14.

From the foregoing it will be perceived that my invention provides means for maintaining the system continuously capable of indicating current with uniform accuracy. The adjustments are very simple and can be made by unskilled personnel with only a minimum of directions.

I have described my invention representatively in connection with the measuring and indicating of electrical current. Conceivably the principle of my invention and its physical manifestation may be practiced in the measuring and indicating of other conditions, qualities, or attributes and it is my intention therefore that the claims embrace all novel aspects of the invention, broadly and specifically, whether with reference to electrical currents or other similar and/or equivalent measurable entities.

I claim:

1. An electrical measuring system of the character described comprising means providing a shunt for electrical connection with a direct current source of electromotive force to divert a portion of the current for testing, an independent direct current source of electromotive force of a predetermined value, a shunt bridged across said second source for providing a voltage drop in opposition to the source of electromotive force to be tested, means for converting the resultant electromotive force into an alternating current electromotive force, a stabilized feedback amplifier coupled to the converting means, a rectifier for reconverting the alternating current electromotive force from said amplifier to a direct current electromotive force, and means fed by the rectifier for measuring it.

2. An electrical system of the character described comprising a source of direct current electrical energy, a second independent source of fixed direct current electrical energy connected in a circuit in opposition to said first source, means for interrupting said circuit to convert the resulting energy into alternating current, a feedback stabilized amplifier coupled to said converting means, and means for measuring the energy from said amplifier.

3. An electrical system of the character described comprising a direct current source to be tested, a second independent direct current source connected in a circuit in opposition to said first source, means for interrupting said circuit to convert the resulting direct current into alternating current, a feedback stabilized alternating current amplifier fed by said converting means, a rectifier coupled to said alternating current amplified for rectifying the output thereof, direct current amplifying means connected to the output of said rectifier, and an indicator coupled to the amplifying means for measuring the current therefrom.

4. A current measuring system of the character described comprising a high current source of direct current potential, means for translating the current from said source into a corresponding voltage, a fixed source of direct current potential, a circuit including a shunt bridged across said second source to provide a voltage drop, means for coupling the translating means and said shunt to a converter with their voltages in opposition, a stabilized degenerative feed-back alternating current amplifier fed by the converter, a rectifier coupled to the amplifier for changing the alternating current to direct current, and a current measuring device connected to said rectifier for measuring the flow of current.

KENNETH G. MacLEISH.

REFERENCES CITED

The following references are of record in the file of this patent:

UNITED STATES PATENTS

| Number | Name | Date |
|---|---|---|
| 1,164,032 | Thomas | Dec. 14, 1915 |
| 2,229,009 | Berry | Jan. 14, 1941 |
| 2,297,543 | Eberhardt et al. | Sept. 29, 1942 |
| 2,355,068 | Graves | Aug. 8, 1944 |
| 2,358,480 | Skilling | Sept. 19, 1944 |
| 2,366,618 | Harrison | Jan. 2, 1945 |
| 2,372,062 | Dorsman | Mar. 20, 1945 |
| 2,403,521 | Gilbert | July 9, 1946 |

FOREIGN PATENTS

| Number | Country | Date |
|---|---|---|
| 306,818 | Great Britain | July 8, 1930 |

OTHER REFERENCES

Publication, Vacuum Tube Meters, by J. F. Rider, published by John F. Rider, Publisher, 404 4th Ave., N. Y. City 16, N. Y., copyright 1941, pages 129–132. Copy in Patent Office Library T, 321, R5 Cop. 2.